United States Patent [19]

Berman et al.

[11] Patent Number: 5,038,341
[45] Date of Patent: Aug. 6, 1991

[54] RELAY COMMUNICATION SYSTEM

[75] Inventors: Arnold L. Berman, Los Angeles; Gilles G. du Bellay, Venice; Marvin R. Wachs, Woodland Hills, all of Calif.

[73] Assignee: Hughes Aircraft Company, Los Angeles, Calif.

[21] Appl. No.: 444,499

[22] Filed: Dec. 1, 1989

[51] Int. Cl.[5] .............................................. H04J 1/04
[52] U.S. Cl. ...................................... 370/18; 370/19; 370/69.1; 370/75
[58] Field of Search ................... 370/18, 19, 21, 69.1, 370/75; 455/12, 13, 17, 20; 342/350, 351, 352, 353

[56] References Cited

U.S. PATENT DOCUMENTS

| 4,232,266 | 11/1980 | Acampora | 455/17 |
| 4,494,228 | 1/1985 | Gutleber | 370/18 |
| 4,697,260 | 9/1987 | Grauel et al. | 370/69.1 |

Primary Examiner—Benedict V. Safourek
Assistant Examiner—Una Kim
Attorney, Agent, or Firm—Robert A. Westerlund; Steven M. Mitchell; Wanda K. Denson-Low

[57] ABSTRACT

The invention is a relay communications system which uses a single reference frequency signal generator to produce a plurality of precisely frequency synchronized code division multiple access radio frequency signals. A transmitter transmits the synchronized signals to a remote satellite based retransmitter which includes a slave oscillator precisely synchronized to the reference signal generator for down-linking the multiple radio frequency signals to a common radio frequency with all of the down-linked signals being in precise phase synchronism. The relative phase of the down-linked signals can be preserved or altered and the signals combined and amplified by a high-power amplifier operating in the saturation mode. The output from the high power amplifier is applied to a beamforming network to form an overlapping beam signal comprised of multiple code division multiple access information signals.

18 Claims, 2 Drawing Sheets 5,038,341

RELAY COMMUNICATION SYSTEM

BACKGROUND

The present invention relates to radio relay transmission systems, and more particularly to a satellite relay transmission system that utilizes a saturated amplifier system to amplify and retransmit synchronously transmitted CDMA signals derived from a ground station.

Satellite communications systems are now well known. In such systems, signals are transmitted from a ground station to a satellite where they are received, amplified, and retransmitted to remotely located receivers. Power consumption, weight, and physical dimensions of the satellite-borne circuitry are of critical importance.

A significant application of satellite communications systems is for mobile communications. In this application, in addition to the critical parameters mentioned above, it is also essential to provide a means to address individual remote users. To this end, CDMA transmissions provide a viable solution. This type of secure transmission may be effected utilizing orthogonal signals or signal groups which can be combined into overlapping beam transmissions. The signals are separable by reason of the characteristics of the orthogonal signals.

In conventional applications, a plurality of orthogonal signals are transmitted to a satellite relay system, where they are combined into the overlapping beam signal using linear amplifiers. While it is well known that linear amplifiers are not the most efficient form of amplifier with respect to power consumption, particularly in digital transmission applications, the need to preserve both phase and amplitude information of the individual CDMA signals has typically required their use.

SUMMARY OF THE INVENTION

In order to overcome the limitations of conventional systems addressed above, the present invention provides a relay transmission or communications system in which the relay transmission of CDMA signals is effected utilizing amplifiers operating in a saturation mode. The system is comprised of a ground-based signal generating circuit which includes circuitry which generates a reference frequency signal, a plurality of orthogonal coded binary phase modulated information signals, and a transmitter circuit which generates and transmits a radio frequency signal for each of the information signals. Each of the radio frequency signals are at a different frequency and each signal is modulated by one of the information signals. The information signals, radio frequency signals, and bit rates of the information signals are based upon the frequency of the reference signal.

A remotely located relay transmitter, typically a satellite relay, includes a receiver which is adapted to receive the modulated radio frequency signals and a master oscillator unit connected to the receiver that is configured to translate these uplink radio frequency signals to a common transmission frequency. The master oscillator unit is slaved to the frequency of the uplink reference signal. Mixers are connected to the master oscillator and the receiver and are adapted to synchronously translate each of the received signals frequencies such that they have a common carrier frequency subsequent to retransmission.

A summing circuit is coupled to the mixers that is configured to adjust the phase relationship of the signals and sum them. The summing circuit is coupled to a power amplifier operating in a saturated mode that in turn feeds a beamforming network. The beamforming network is configured to form several overlapping beams which include all of the information signal modulations from the plurality of information signals. Because the signals are synchronous, they are precisely phase-related, which results in controlled distortion in the saturating amplifier. Subsequent separation of the multiple overlapping information signals may be achieved in accordance with known methods for separating CDMA signals.

It is therefore an advantage of the invention to provide an improved relay communication system. It is another advantage of the invention to provide a relay communication system that utilizes a single reference frequency signal to generate synchronized radio frequency signals and a relay transmitter that utilizes the same reference frequency signal to produce synchronized downlink signals having a single frequency that are phase adjusted, combined and amplified with amplifiers operating in a saturation mode to form an overlapping beam signal. Yet another advantage of the invention is to provide a relay communication system in which precisely phase related information signals are amplified with amplifiers operating in a saturated mode preserving the phase relationship without the need for amplitude information.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
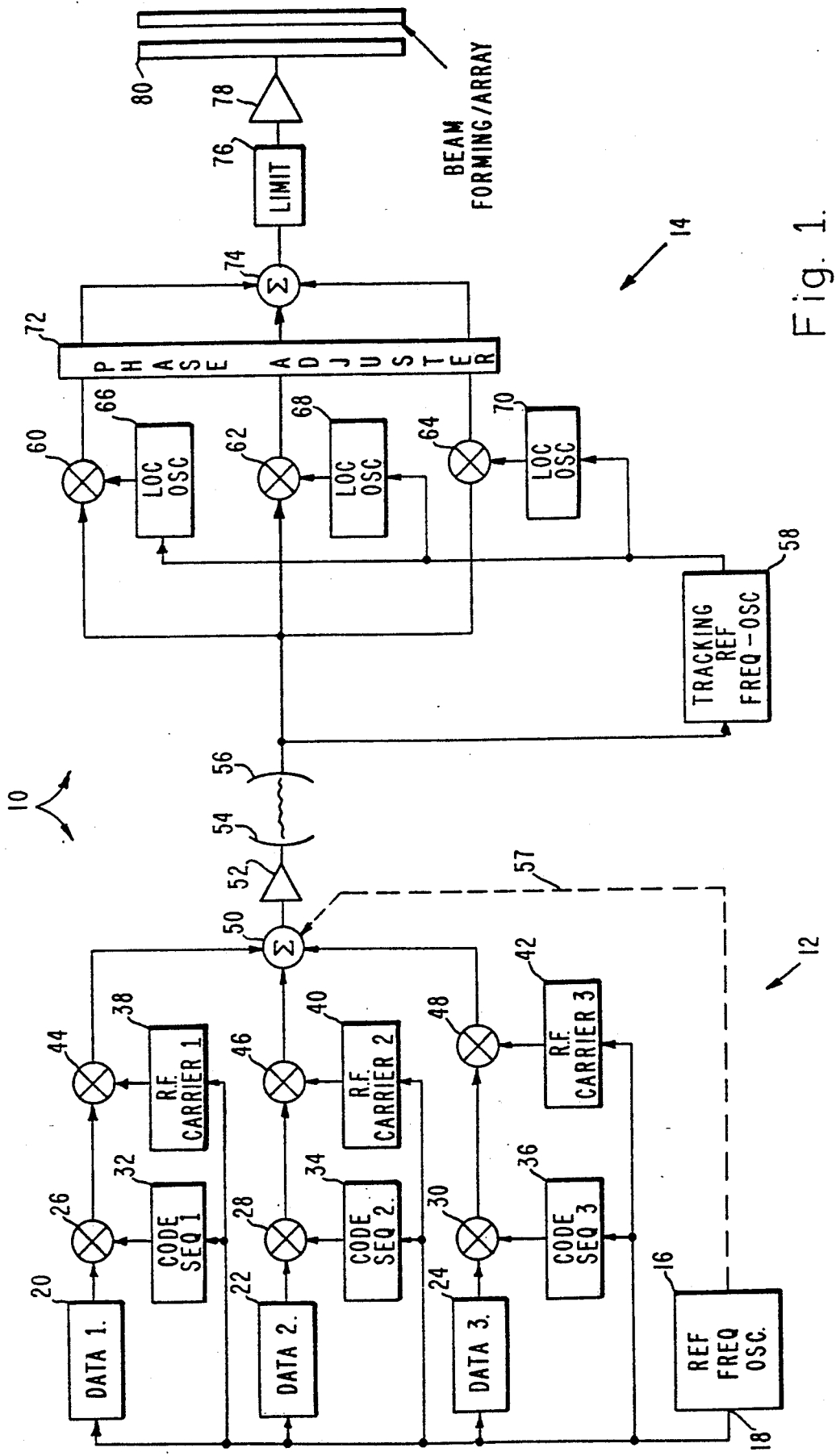
FIG. 1 is a diagram of a relay communication system in accordance with the principles of the present invention.

Referring to FIG. 1, there is shown a relay communications system 10 in accordance with the principles of the present invention. The system 10 comprises a ground based signal generating circuit 12 and a remotely located retransmitter or relay circuit 14. Typically, but not necessarily, the retransmitter or relay circuit 14 is a satellite based circuit.

The ground based circuit 12 includes a master reference frequency oscillator 16 that is adapted to generate a single, fixed frequency clock or reference frequency signal that is provided at its output 18. The reference frequency signal is coupled simultaneously to inputs of three data generating circuits 20, 22, and 24. The data generating circuits 20, 22, and 24 are each adapted to generate an input data signal in the form of binary coded data signals. The data generating circuits 20, 22, 24 are well known in the art, the particular circuitry employed is dependent upon the particular application of the system 10. The binary coded data signals are typical binary 1 and 0, or +1, −1, information bits. It is significant that the data bit rate is derived from the reference frequency signal generated by the oscillator 16.

Figure 2:
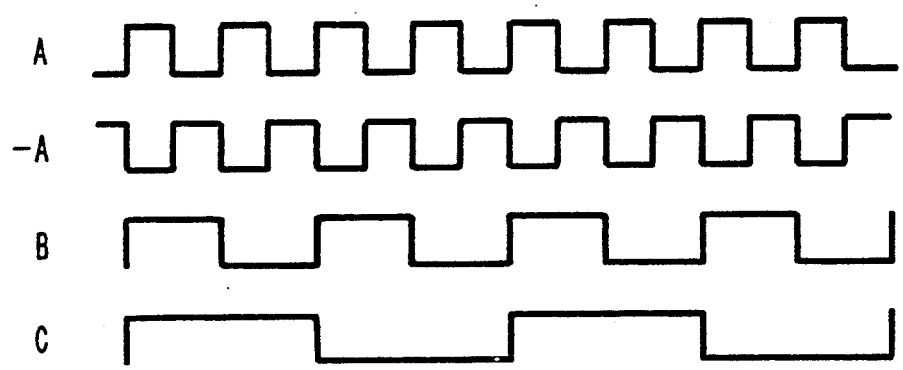
FIG. 2 is a chart showing the relationship of synchronously generated orthogonal binary phase modulated signals output by data signal mixers signals employed in the system of FIG. 1.

The binary coded data signals are coupled from the circuits 20, 22, 24 to respective ones of a first plurality of mixers 26, 28, and 30. Simultaneously, the reference frequency signal provided by the oscillator 16 is coupled to a plurality of code sequence generating circuits 32, 34, and 36. The code sequence generating circuits 32, 34, and 36 are keyed or synchronized by the reference frequency signal from the oscillator 16. Each of the code sequence generating circuits 32, 34, 36 is adapted to generate a different digital code in the form of a specific or variable bit sequence. The code sequence signals are coupled to the mixers 26, 28, 30 respectively, which is configured to mix the code sequence signals with the data signals provided by the data signal generators 20, 22, 24 to generate a plurality of coded signals. Significant to the invention, the signals provided from the mixers 26, 28, 30 are orthogonal signals. A typical sequence of orthogonal signals is shown in FIG. 2. Such signals exhibit the characteristics: $A \cdot A = A; A \cdot (-A) = -A; A \cdot B = O$, for $A \neq B$; and $A \cdot (A + B) = A$.

The reference frequency signal provided by the oscillator 16 is simultaneously coupled to three radio frequency carrier generating circuits 38, 40, 42. Such radio frequency carrier generating circuits are well known in the art and generate radio frequency signals of desired frequency suitable for transmission of information. Significant to the invention, the three radio frequency carrier generating circuits 38, 40, 42 are each adapted to generate a radio frequency signal that is derived from combinations of sums and multiples of the reference frequency signal. The mixers 26, 28, 30 and the radio frequency carrier generating circuits 38, 40, 42 are respectively coupled to a second plurality of mixers 44, 46, 48. The coded data signals provided by the first plurality of mixers 26, 28, 30 are simultaneously coupled to the second plurality of mixers 44, 46, and 48 with the radio frequency carrier signals from the radio frequency carrier generating circuits 38, 40, 42. This achieves modulation of the radio frequency carrier signals with the coded data signals.

It should be recognized that the output signals from the second plurality of mixers 44, 46, 48 comprise a group of signals A, B, C as shown in FIG. 2 that are suitable for code division multiple access (CDMA) transmission. These three signals are simultaneously coupled to a summing circuit 50 where they are combined and coupled through a high power amplifier 52 and an antenna 54 for transmission. Typically, the antenna 54 is a directional antenna that directs the combined signal to a receiving antenna 56 of the retransmitter or relay circuit 14.

The reference frequency signal is also simultaneously transmitted with the CDMA signals. This transmitted reference frequency signal may be derived from the bit rate of the data signals generated by the data circuits 20, 22, 24, all of which are derived from the reference frequency signal. Alternatively, it may be obtained by coupling the output signal from reference frequency oscillator 16 to the summing circuit 50, as indicated by dashed line 57, where it is combined and transmitted with the CDMA signals.

The retransmitter or relay circuit 14 includes a tracking reference frequency oscillator 58 connected to the receiving antenna 56. The tracking reference frequency oscillator 58 includes circuitry for detecting the reference frequency signal from the data bit rate as discussed above, and circuitry for generating or duplicating the reference frequency signal.

The CDMA signals received at the receiving antenna 56 are coupled to and amplified in a low-noise stage (not shown) separated by filters (not shown), and applied to three mixing circuits 60, 62, 64. The output from the tracking reference frequency oscillator 58 is coupled to the inputs of three local oscillators 66, 68, 70. Each of the local oscillators 66, 68, 70 is adapted to generate a mixing signal derived from the reference frequency signal that is synchronized therewith. The frequencies provided by each of the local oscillators 66, 68, 70 are further selected such that when mixed with the radio frequency carrier signals generated by the radio frequency carrier generating circuits 38, 40, 42, produce output signals from each of the three mixer circuits 60, 62, 64 that have a single frequency. That is, the output signals from the mixers 60, 62, 64 are at the same frequency and are in synchronism.

The output signals from the mixers 60, 62, 64 are simultaneously coupled to a phase adjusting circuit 72 where a precise phase relationship between the three signals is established. One optimum arrangement for the phase adjusted signals is that the phase vectors of two of the signals are aligned while the third signal has a phase orthogonal to the first two. Such an arrangement is adapted to minimize the dynamic range of the amplitudes of the signals.

The phase adjusting circuit 72 is coupled to a summing circuit 74, wherein the three phase adjusted signals are combined. Thee summing circuit 74 is coupled by way of a limiter circuit 76 to a high power amplifier 78. The high power amplifier 78 is then coupled to a beamforming network 80. The beamforming network 80 is a device well known in the art, and typically includes a plurality of radiating elements and wherein the relative phase of the output signals provided by individual elements of a beamforming array are precisely controlled to form a beam directed in a particular direction or a group of directions.

In conventional systems, both the phase and amplitude of the signals provided to the beamforming network 80 must be preserved to form the required overlapping signal beam. Further, due to the requirements that the output beam include up to three signals, the high-powered amplifiers 78 may have to carry signals for up to three beams. These signals are BPSK modulated with different information carried by each signal. Accordingly, the signals will have a different phase relationship over time. The direct and most obvious way to conserve both the amplitude of phase relationship is, as taught in the prior art, to oversize the amplifiers 78 and operate them in the quasi-linear operating mode. It is well known that linear operation of the amplifiers 78 is wasteful of the power in the DC mode.

However, in accordance with the present invention, and with reference to the combining of two signals only, the relative phase of the radio frequency carrier signals downlinked in the mixers 60, 62, for example, are adjusted so that the vectors of the signals are orthogonal. The composite signal provided by the summing circuit 74 has a constant envelope and is QPSK modulated. Accordingly, the amplifiers 78 are operated at saturation with maximum efficiency. The amplifiers 78 have twice the rated power of conventional amplifiers which carry only one signal of one beam, and are also operated in the saturated mode.

When three signals are combined, there are eight combinations of phase states, each associated with different amplitudes. In accordance with the present invention, because of the limiter 76, phase information is conserved while the amplitude information is lost. However, the precise synchronization of the signals enables a desired phase relationship to be established between the three signals such that the amplitude information is not required.

Figure 3A:
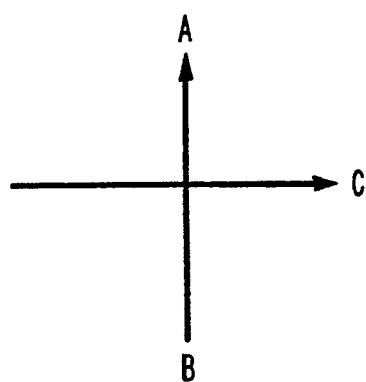
FIGS. 3a and 3b are vector diagrams useful in explaining alternative phase relationships of the information signals in retransmitted overlapping beam signals produced by the system of FIG. 1.
Figure 3B:
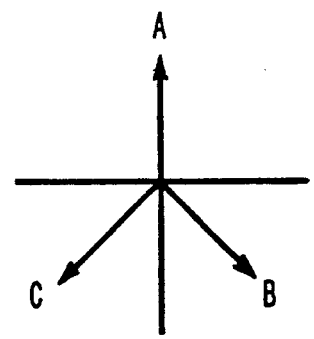

In applications where multiple signals are amplified with a common saturating amplifier 78, several phasing relationships, shown by vectors A, B, C in FIGS. 3a and 3b, allow operation of the amplifier 78 with high efficiency. In FIG. 3a, two signals A, B are aligned, and signal C has its phase orthogonal to the two signals A, B. In FIG. 3b, the three signals A, B, C are adjusted to have a relative phase shift of 120 degrees with respect to each other. As a result of simulation studies, it has been found that when the three components are extracted from the output signal, the useful power from each of the signals is down about 6.1 dB from the total output power instead of an ideal 4.8 dB corresponding to one-third of the total power. Accordingly, the amplifier 78 may be increased in power to about a 35 percent higher power rating, rather than requiring three times the power rating of the amplifier 78 amplifying one beam. This is contrasted with significantly higher losses in efficiency for either the case of a linear amplifier, or in the case of a saturating amplifier with uncontrolled phases among the signal set.

For the convenience of the system designer, the reference frequency signal for the coherent relationships of the signals may be derived from the specific reference frequency signal from the circuit 12, or derived from the envelope of the bit rate of one of the carriers. In either case, the system is configured so that all frequencies are derived from a submultiple of the bit rate.

From the above description of the present invention, the use of a single reference frequency signal to generate the coded information signals and downlink the signals, enables the use of high power amplifiers operating in a saturated mode. The amplifiers efficiently amplify three or more signals simultaneously while operating in saturation mode without the need for preserving amplitude information in the signals. This is possible because of the synchronization of, or phase relationship between, the signals, and by the use of a single reference frequency signal to generate and frequency alter the frequency signals.

Thus there has been described a new and improved relay communications system that utilizes a saturated amplifier system to amplify and retransmit synchronously transmitted CDMA signals derived from a ground station. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A communication system comprising:

signal generating means for generating a reference frequency signal and a plurality of code division multiple access modulated radio frequency signals synchronized therewith;

means for transmitting the radio frequency and reference frequency signals;

a remote retransmitter including receiving means for receiving the transmitted radio frequency and reference frequency signals, and means connected to the receiving means for reproducing the reference frequency signal;

common frequency generating means responsive to the reproduced reference frequency signal for synchronously frequency-altering the radio frequency signals to generate a common frequency;

phase adjusting means coupled to the common frequency generating means adapted to receive the frequency-altered radio frequency signals for adjusting the phase of each of the frequency-altered radio frequency signals to have a predetermined phase relationship with respect to the others;

beamforming means connected to the phase adjusting means and including at least one saturation mode amplifier for forming and retransmitting an overlapping beam signal comprised of the phase-adjusted, frequency-altered radio frequency signals.

2. The system of claim 1 wherein the reference frequency signal generating means comprises a fixed frequency oscillator.

3. The system of claim 2 wherein the signal generating means includes a code sequence signal generating circuit for generating code sequence signals, an information signal generating circuit for generating a plurality of orthogonal information signals, and means for combining code sequence signals and orthogonal information signals to produce coded sequence information for each of the plurality of radio frequency signals.

4. The system of claim 3 wherein the frequency of the reference frequency signal comprises the bit rate frequency.

5. The system of claim 4 wherein the means for reproducing the reference frequency signal comprises a tracking oscillator responsive to a bit rate envelope of the information signal, which bit rate envelope is employed to reproduce the reference frequency signal.

6. The system of claim 1 wherein the phase adjusting means further comprises summing circuit means for summing the frequency-altered phase-adjusted radio frequency signals; and signal limiter means connected between the summing means and the beamforming means for limiting the amplitude of signals provided to the saturation mode amplifier.

7. The system of claim 6 which comprises two radio frequency signals, the phase adjusting means adjusting the relative phases of the two signals to be orthogonal.

8. The system of claim 6 which comprises three radio frequency signals, the phase adjusting means adjusting the relative phase of two of the signals to be in alignment with each other and adjusting the third of the signals to be orthogonal thereto.

9. The system of claim 6 which comprises three radio frequency signals, the phase adjusting means adjusting the phase of the three signals to be displaced 120 degrees relative to each other.

10. A relay communications system comprising:

reference signal generating means for generating a first reference signal;

data signal means coupled to the reference signal generating means for generating a plurality of coded orthogonal binary phase modulated data signals in synchronism with the first reference signal;

carrier signal generating means for generating a radio frequency carrier signal for each of the information signals, each of the radio frequency carrier signals having a different frequency derived from and synchronized with the first reference signal and being modulated by one of the data signals;

transmitter means coupled to the carrier signal generating means for transmitting the modulated radio frequency signals;

a remotely located relay transmitter including receiver means for receiving the modulated radio frequency signals, a slave oscillator coupled to the receiver means and adapted to reproduce the reference frequency signal, mixer means coupled to the slave oscillator and to the receiver means for synchronously altering each of the received modulated radio frequency signals to have a common carrier frequency, phase adjusting means coupled to the mixer means for processing the frequency altered signals and adjusting the phase of the signals to have a predetermined phase relationship with respect to each other, and summing means coupled to the phase adjusting means for combining the frequency altered radio frequency signals;

a limiter circuit coupled at its input to said summing means, and coupled at its output to a high power amplifier operating in a saturation mode for processing and amplifying the combined frequency altered radio frequency signals; and a beamforming network coupled to the power amplifier adapted to form an overlapping radio frequency beam signal including the binary phase coded signals.

11. The system of claim 10 wherein the binary phased coded signals are CDMA coded signals.

12. The system of claim 11 wherein the CDMA signals comprise orthogonal signals.

13. The system of claim 10 wherein the slave oscillator is adapted to derive its frequency from the bit rate of one of the data signals.

14. The system of claim 10 wherein the slave oscillator is adapted to derive its frequency from the first reference frequency signal.

15. The system of claim 10 wherein the remotely located relay transmitter is a satellite-based relay transmitter.

16. The system of claim 10 which comprises two radio frequency carrier signals, and wherein the slave oscillator and mixer means is adapted to alter the phase of the two radio frequency carrier signals to be orthogonal to each other.

17. The system of claim 10 wherein the frequency altered radio frequency signals include three data signals that have a relative phase of 120 degrees with respect to each other.

18. The system of claim 10 wherein the data signals include three data signals, the phase of the data signals in the radio frequencycarrier signals include two information signals in phase alignment and one data signal having a phase orthogonal to the first two.

* * * * *